United States Patent [19]

Konishi

[11] Patent Number: 4,676,326

[45] Date of Patent: Jun. 30, 1987

[54] COMBINATIONAL WEIGHING METHOD AND APPARATUS THEREFOR WITH MULTIPLE SELECTED COMBINATIONS AND MULTIPLE DISCHARGE PATHS

[75] Inventor: Satoshi Konishi, Kusatsu, Japan

[73] Assignee: Ishida Scales Manufacturing Company, Ltd., Kyoto, Japan

[21] Appl. No.: 787,325

[22] Filed: Oct. 15, 1985

[51] Int. Cl.$^4$ ............................................. G01G 19/22
[52] U.S. Cl. ............................................. 177/1; 177/25
[58] Field of Search ............................... 177/1, 25, 59

[56] References Cited

U.S. PATENT DOCUMENTS

| | | | |
|---|---|---|---|
| 4,399,880 | 8/1983 | Konishi | 177/1 |
| 4,467,880 | 8/1984 | Minamida et al. | 177/59 X |
| 4,544,042 | 10/1985 | Mikami | 177/25 |
| 4,558,774 | 12/1985 | Mikami | 177/25 X |
| 4,570,727 | 2/1986 | Ueda | 177/25 |

Primary Examiner—George H. Miller, Jr.
Attorney, Agent, or Firm—Flehr, Hohbach, Test, Albritton & Herbert

[57] ABSTRACT

A combinational weighing system with a plurality of article batch handling units is controlled so that a high-speed dual or multiple packaging unit can be coupled and its capability can be utilized advantageously. For each cycle of the system operation, three or more combinations are selected by combinational computations on the weight values of article batches and they are discharged to the packaging unit through two discharge routes or more but fewer than the number of the selected combinations. This has the effect of discharging through each discharging route more than once per cycle.

20 Claims, 14 Drawing Figures

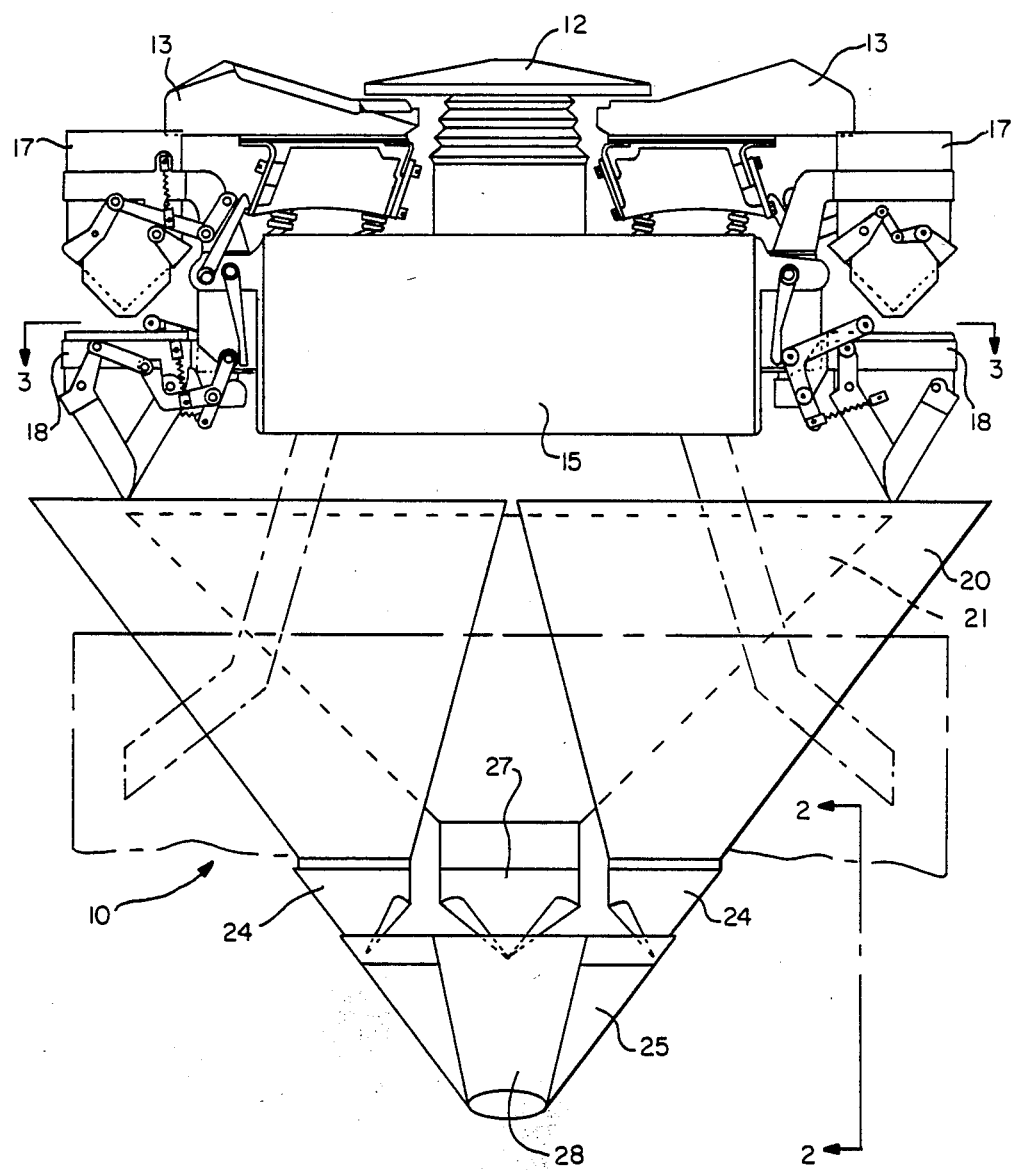
FIG.—1

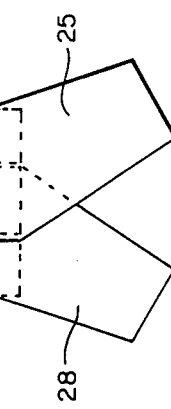
FIG.—2
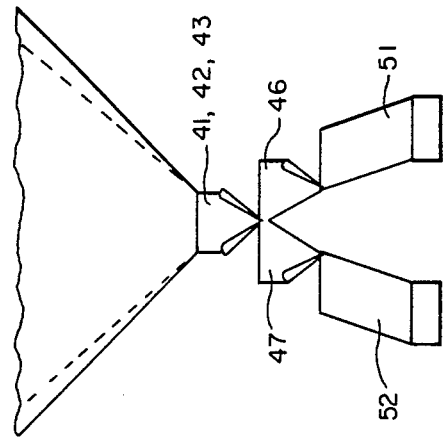
FIG.—7
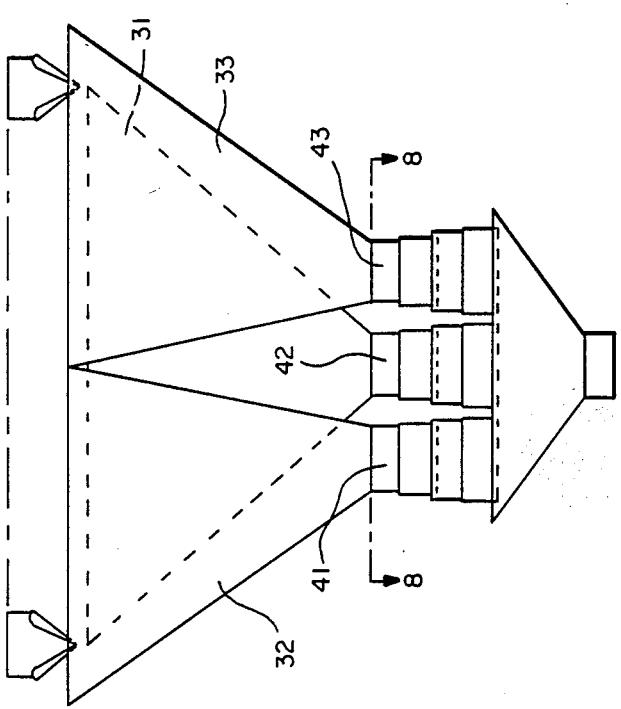
FIG.—6
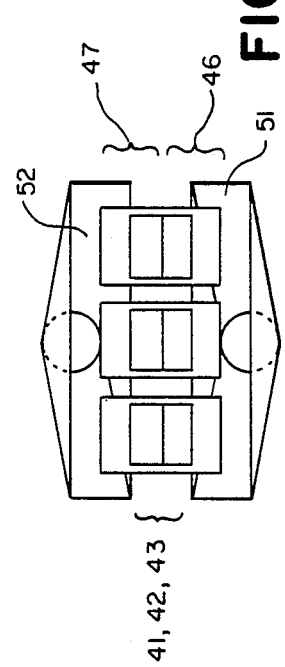
FIG.—8

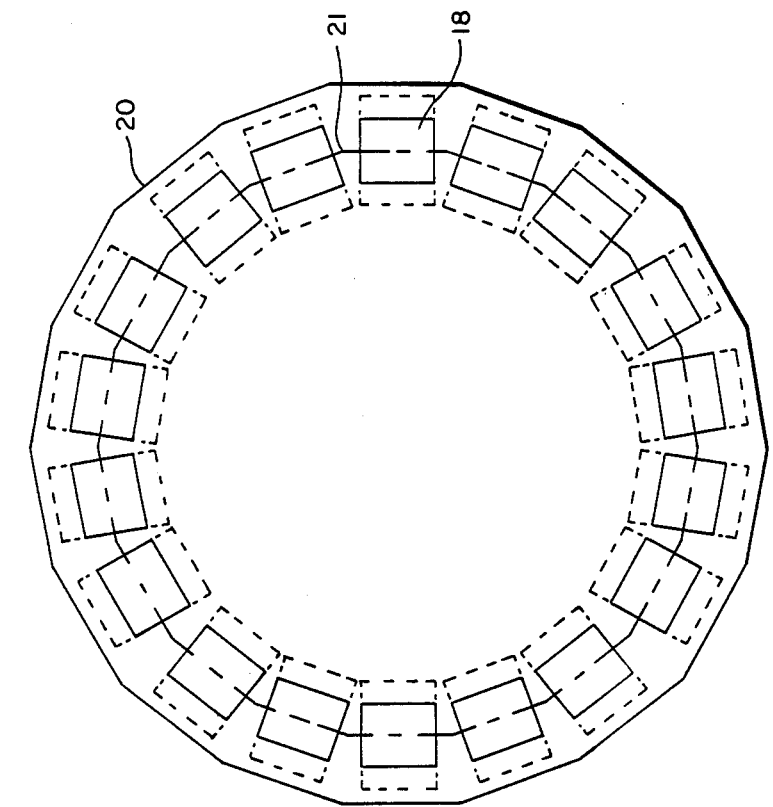
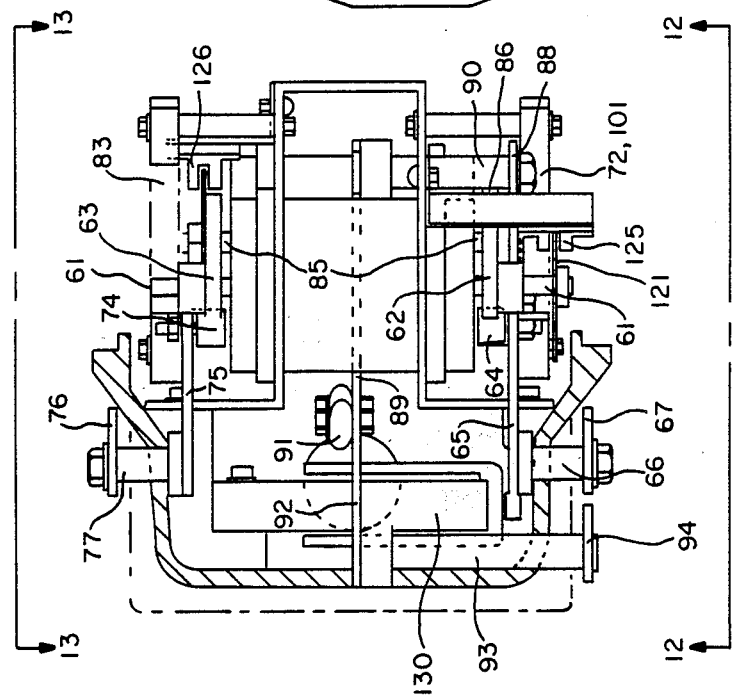

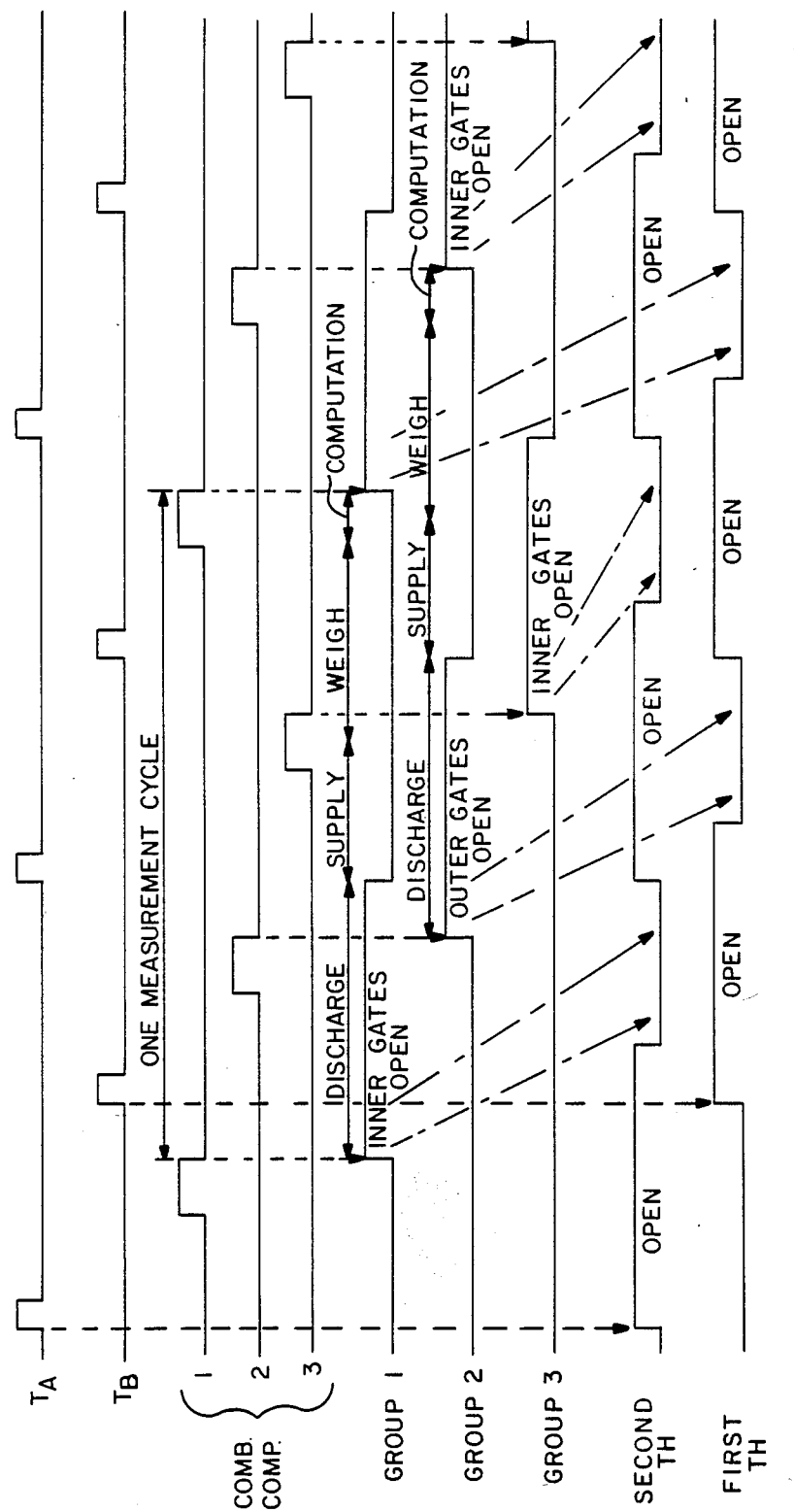
FIG.—4

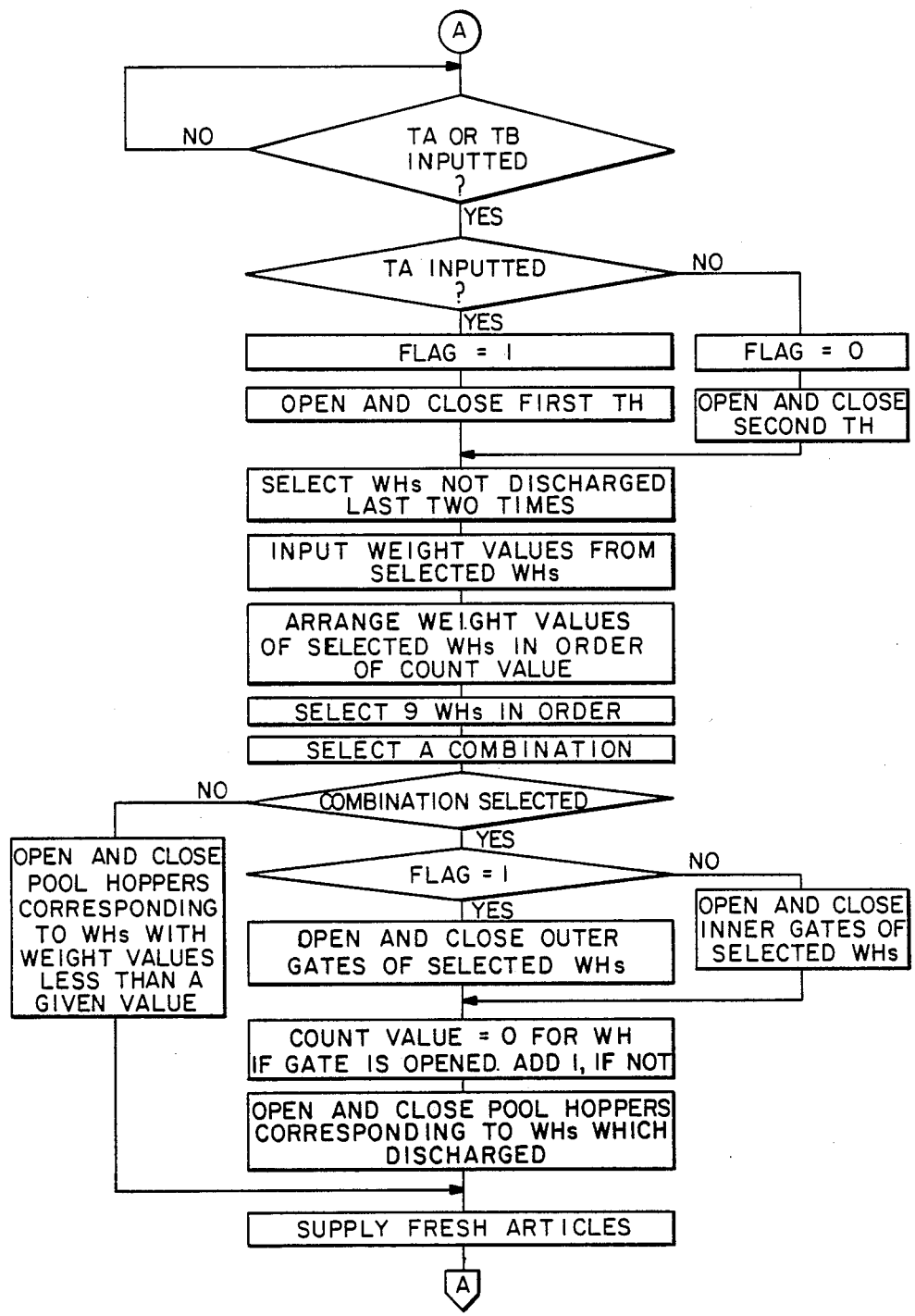
FIG. —5

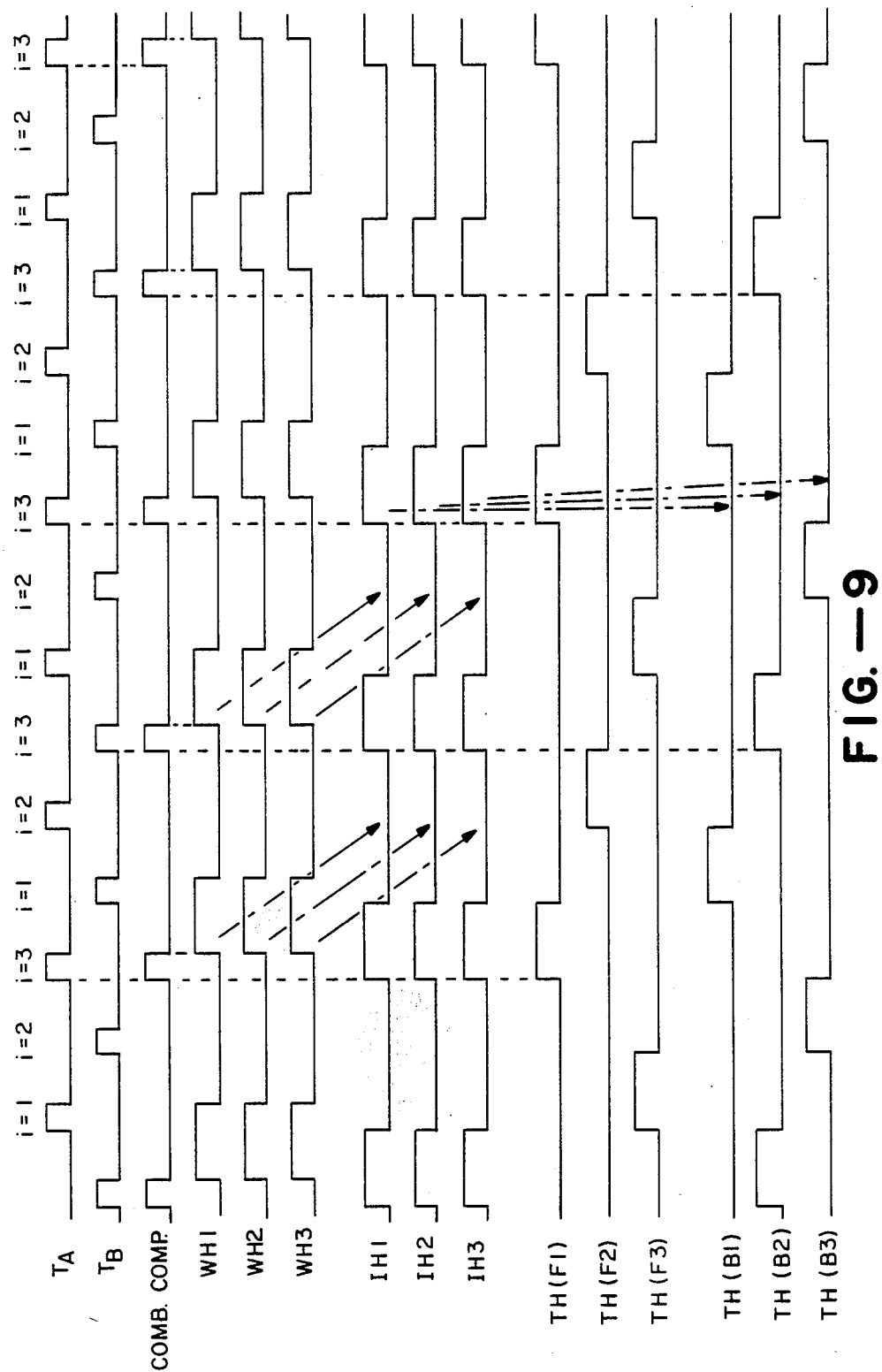
FIG.—9

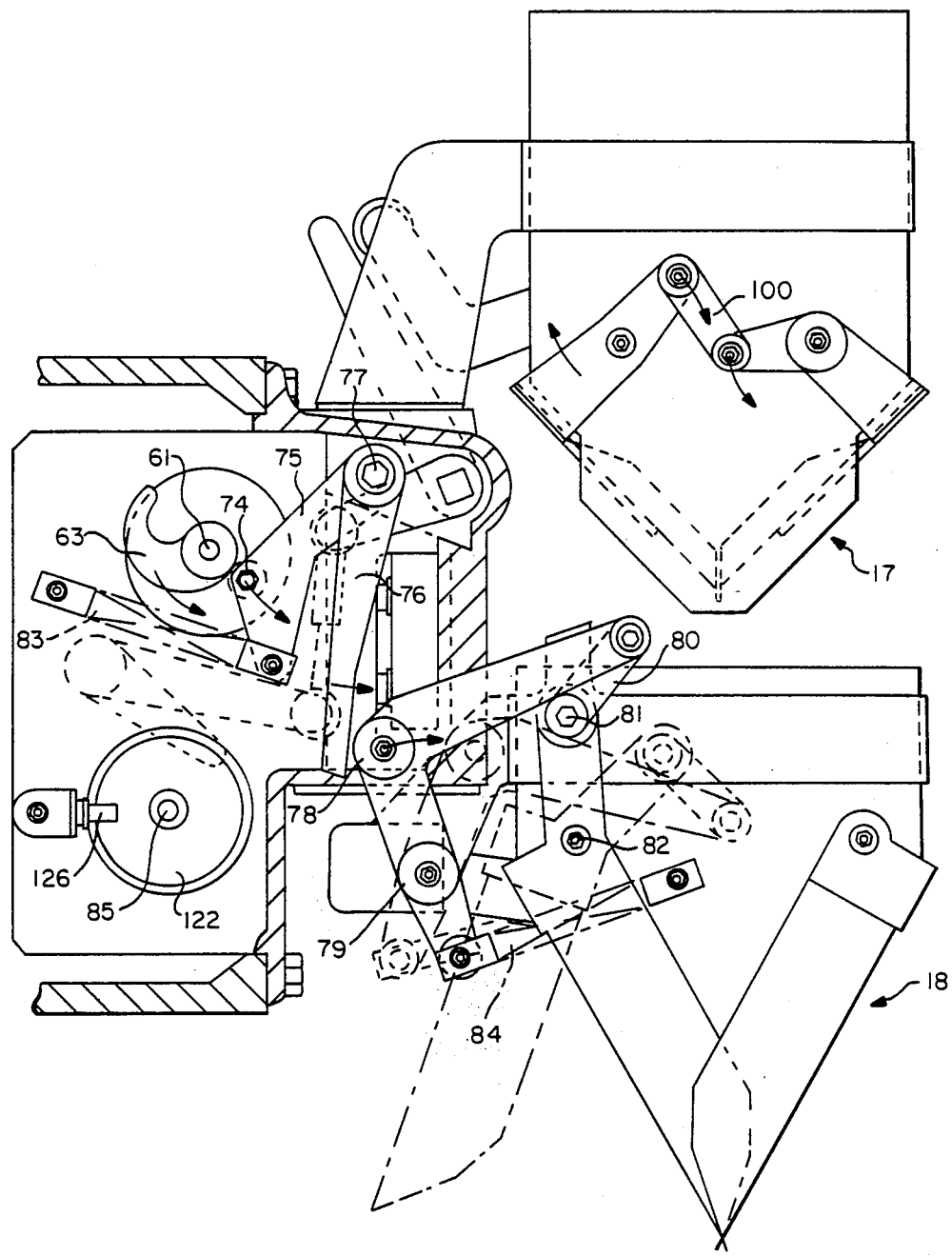
FIG.—13

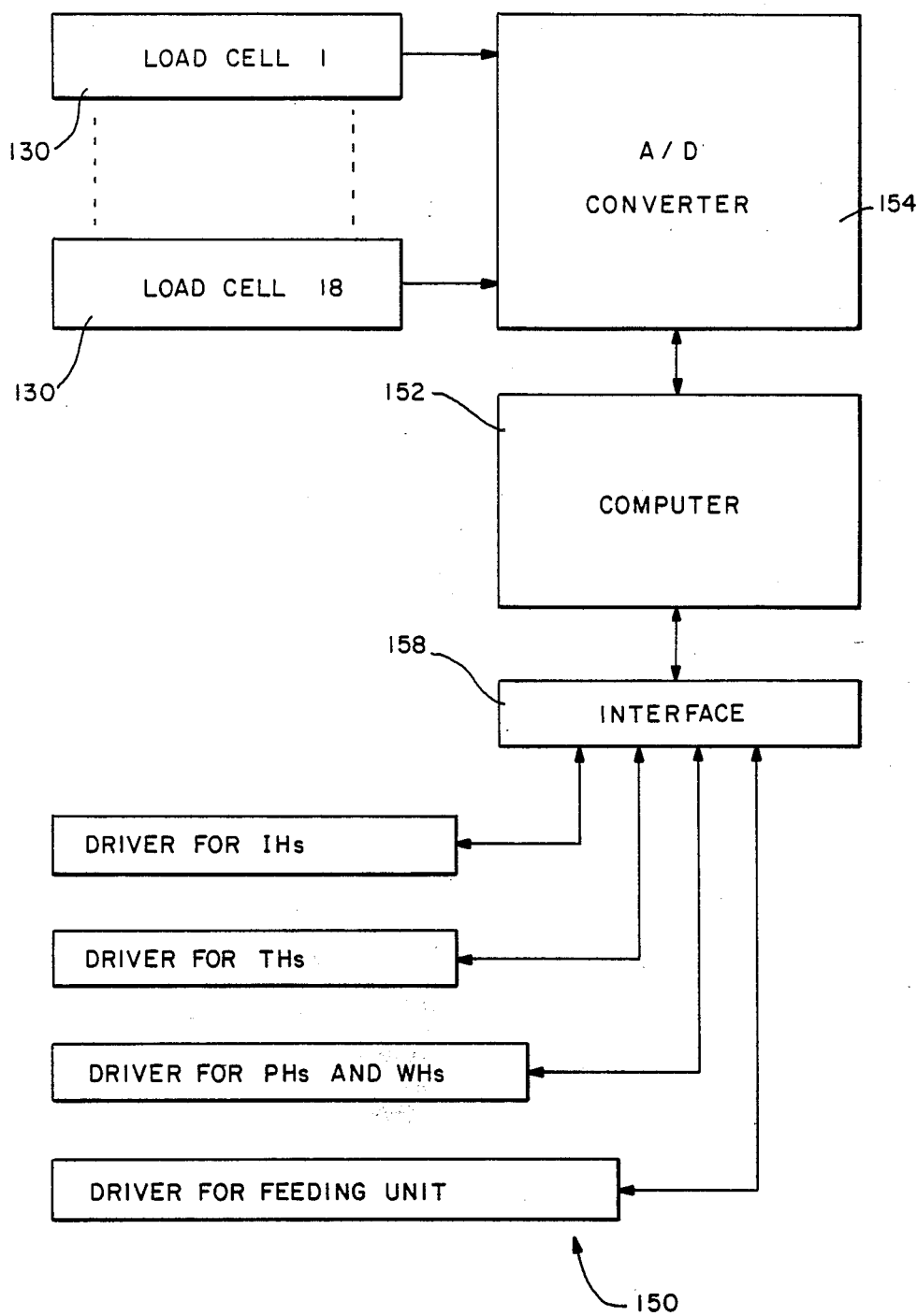
FIG.—14

COMBINATIONAL WEIGHING METHOD AND APPARATUS THEREFOR WITH MULTIPLE SELECTED COMBINATIONS AND MULTIPLE DISCHARGE PATHS

This invention relates to combinational weighing and more particularly to a method of combinational weighing and an apparatus therefor whereby the advantage of a high-speed dual or multiple packaging unit can be fully realized.

Combinational weighing means weighing articles by a plurality of weighing devices, performing arithmetic operations for combinations of measured weight values and then selecting a combination according to a predetermined criterion. The major features of combinational weighing are great accuracy and high throughput. U.S. Pat. No. 4,398,612 issued Aug. 16, 1983 and assigned to the present assignee, for example, discloses an automatic weighing system of a combinational weighing type having a number (typically 10 to 14) of article batch handling units arrayed radially in a circular formation. Articles to be weighed are typically transported by a conveyor and dropped onto an article feeding unit which distributes them into the individual article batch handling units. Weight-measuring means associated with the individual article batch handling units are electrically connected to a control unit such as a computer. The computer not only computes combinations of weight values obtained from these weight-measuring means and selects a combination according to a predetermined criterion such as the combination which gives a total weight that is within a preselected range, but also discharges the article batches for packaging from these selected article batch handling units. In order to clearly understand the background of the present invention, let us consider a mode of combinational computation in which measured values from ten article batch handling units are employed for the combinational computation to select a combination. The total number of combinations of these ten measured values is $2^{10}-1=1023$, of which the number of combinations of 4, 5 and 6 measured values are $_{10}C_4 + {}_{10}C_5 + {}_{10}C_6 = 672$, amounting to nearly 66% of the total number of combinations. This, however, is but a typical example which demonstrates that the number of ways in which combinations of n values can be made out of a given total number m (m being greater than n) is particularly large when n is nearly equal to m/2, or that the maximum value of $_mC_n$ for a fixed value of n is reached when $m=2n$ if m is even and $m=2n+1$ and $2n-1$ if m is odd. For this reason, if ten is the number of measured values to be included in a combinational computation, the rate at which the articles to be weighed are supplied to the individual article batch handling units should be so regulated that 4, 5 or 6 article batch handling units will be selected each time as the combination satisfying the predetermined criterion. Although the operating speed of a combinational weighing system generally depends on the characteristics of the articles to be weighed, it is about 60 cycles/minute in the case of a combinational computation using ten measured weight values from ten article batch handling units. The word "cycle", or "measurement cycle" as will be used frequently below, means herein the shortest interval between two consecutive times at which any of the article batch handling units of the combinational weighing system receives a new article batch for outputting a weight signal indicative of its weight in order to participate in a combinational computation under normal operation in one of its modes of operation.

Recently, however, progress in the packaging technology has developed packaging units which are capable of operating at a fast rate of about 120 cycles/minute. In order to take full advantage of such high-speed packaging machines, therefore, various types of high-speed combinational weighing systems have been developed and produced as described, for example, in U.S. Pat. Nos. 4,396,078 and 4,399,880, both assigned to the present assignee. A system of this type is characterized in that there are always coexisting two groups of article batch handling units, each performing a series of operations including receiving articles to be weighed, measuring the weights of received article batches, computing combinations and discharging article batches such that, while one of the groups is carrying out the article batch supplying process, for example, the other group is engaged in the discharging process. In summary, the basic principle of such high-speed combinational weighing systems has been to control the system in such a way that the system discharges two (or more) times per cycle of the measurement cycle.

To explain the above method of operation more in detail by way of an example, let us consider a system with 14 article batch handling units and assume that ten of these 14 article batch handling units are made to participate in combinational computation each time. The rate at which articles are supplied to the article batch handling units is so regulated that weighed article batches from about four article batch handling units are discharged each time. After a first combination of about four article batch handling units is selected and article batches are discharged therefrom, fresh batches are supplied to these article batch handling units. While these article batch handling units are being filled with fresh batches, the remaining ten article batch handling units do not remain idle but a combinational computation is carried out from the ten measured weight values therefrom to determine a combination of about four article batch handling units. These newly selected article batch handling units are emptied and while they are being supplied with fresh batches of articles, the remaining unselected article batch handling units (about six of them) join the initially selected article batch handling units (about four of them) which have been supplied with fresh article batches and a combinational computation is subsequently carried out on the basis of these article batch handling units (about ten in number).

A high-speed combinational weighing system of the type described above, however, is effective only if the sequentially discharged groups of article batches are collected by means of a single chute. If the system is provided with two chutes to be used in combination with a dual packaging unit, the two chutes are employed only in alternate cycles and the frequency of discharge into each chute becomes one-half. This means that the frequency with which each chute is used is not increased to take advantage of the high-speed capability of the packaging unit by this mode of controlling the system operation.

It is therefore an object of this invention to improve the capability of combinational weighing.

It is another object of this invention to improve the processing speed of combinational weighing.

It is still another object of this invention to provide a combinational weighing system to be used in combination with a high-speed dual (or multiple) packaging unit for increased processing speed and a method of controlling the operation of such a system.

The above and other objects are achieved by a method of high-speed combinational weighing and an apparatus therefor according to the present invention whereby a plurality of article batch handling units of a conventional type for receiving, weighing and discharging article batches are so controlled that a first number (such as three) of combinations are selected per cycle of operation by combinational computations and that they are discharged alternately through a second number (such as two) of discharge routes per cycle. If the first number is selected to be larger than the second number, the discharge frequency through each route is greater than one.

The accompanying drawings, which are incorporated in and form a part of the specification, illustrate embodiments of the present invention and, together with the description, serve to explain the principles of the invention.

FIG. 1 is a side elevational view of a principal part of a combinational weighing system according to one embodiment of the present invention.

FIG. 2 is a side view of a portion of the chute assembly of the combinational weighing system of FIG. 1 seen along the line 2—2 therein.

FIG. 3 is a plan view taken along the line 3—3 of FIG. 1.

FIG. 4 is a timing chart for a mode of operating the combinational weighing system of FIGS. 1, 2 and 3.

FIG. 5 is an action flow chart for the mode of operation depicted in FIG. 4.

FIG. 6 is a front view schematically illustrating the structure of the chute assembly of a combinational weighing system according to another embodiment of the present invention.

FIG. 7 is a side view of the chute assembly of FIG. 6.

FIG. 8 is a cross-sectional view taken along the line 8—8 of FIG. 6.

FIG. 9 is a timing chart for a mode of operating the combinational weighing system of FIGS. 6, 7 and 8.

FIG. 11 is a plan view of a hopper-operating mechanism for a combinational weighing system of the present invention.

FIG. 13 is another side elevational view taken along the line 13—13 of FIG. 11.

FIG. 14 is a block diagram schematically showing the control unit according to one embodiment of the invention.

Figure 10:
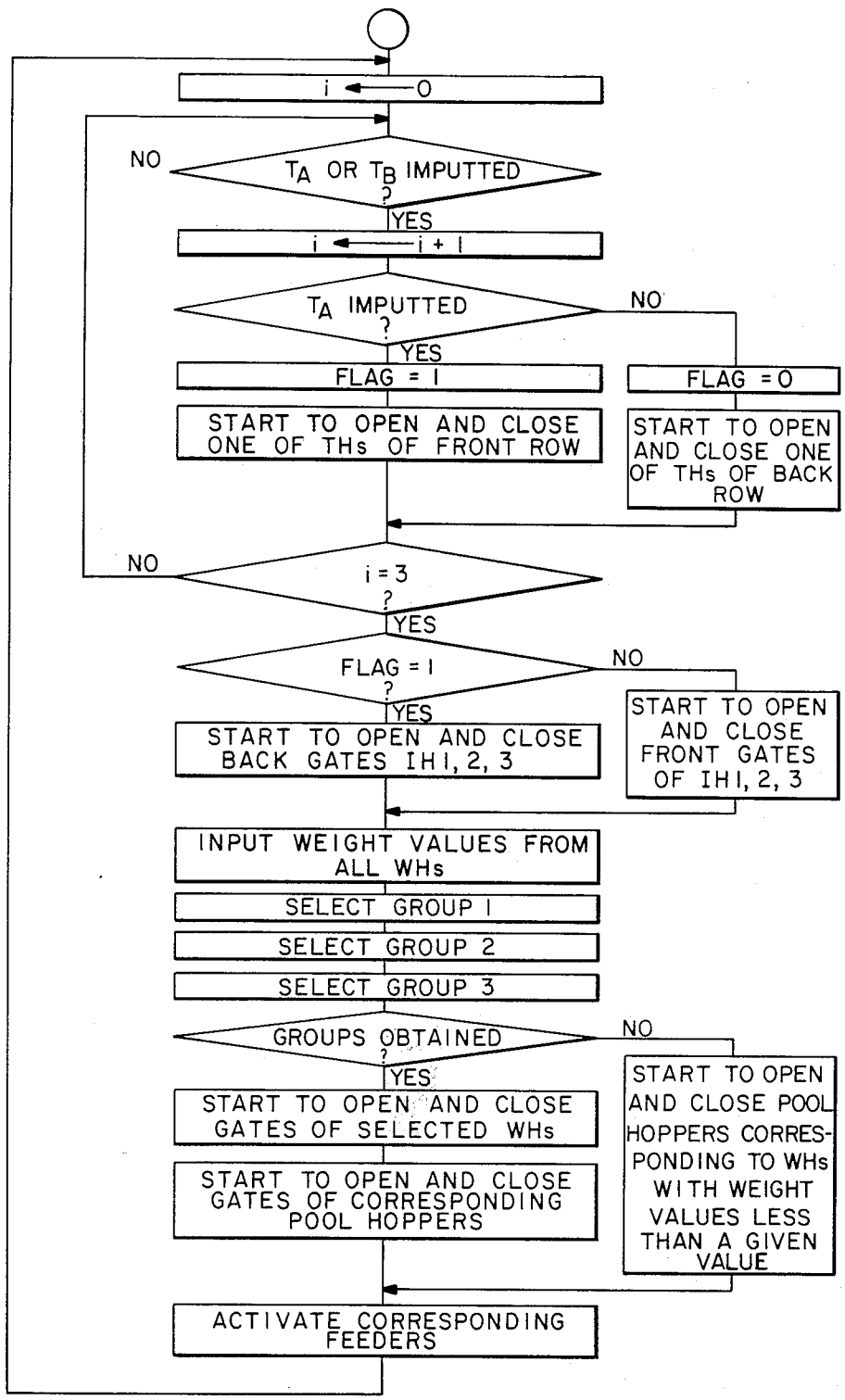
FIG. 10 is an action flow chart according to the timing chart of FIG. 9.

According to one embodiment of the present invention, combinational weighing is performed three times per measurement cycle (spanning a period from the supplying of article batches to their discharge) to obtain three selected sets of combined article batches, and these three sets of article batches are sequentially discharged through two separate discharge routes. By a method according to this embodiment, the time intervals between consecutive discharges through each discharge route can be reduced to two-thirds of the measurement cycle and this means an increase in the discharge capability by a factor of 1.5.

In FIG. 1, there is shown a side elevational view of a principal part of a combinational weighing system 10 for performing combinational weighing according to the aforementioned method of the present invention. The articles to be weighed are transported by a conveyor means (not shown) and dropped onto a dispersion table 12 which is a circular table with a lightly inclined conical top surface so that the articles dropped thereonto from the conveyor means can be made to disperse uniformly in radial directions. A plurality of (18 according to this embodiment) feed troughs 13 each with an article receiving end and an article delivering end are arranged in a circular formation around the dispersion table 12 with their article receiving ends adjacent thereto. Both the dispersion table 12 and the feed troughs 13 are supported on a system housing 15 preferably through individual vibration-causing means (not shown) which serve to cause vibrational motion of the articles thereon. The feed troughs 13 are disposed radially and serve to deliver the articles to be weighed into the individual article batch handling units associated therewith. Each article batch handling unit includes a pool hopper 17 serving to receive an article batch from the feed trough 13 associated with the article batch handling unit to which it belongs and to discharge the same article batch into a weigh hopper 18 belonging to the same article batch handling unit and situated immediately therebelow. A weigh hopper 18 is connected to a weighing device (not shown in FIG. 1) such as a load cell and serves momentarily to hold the article batch received from the pool hopper 17 thereabove. The weight values measured by the load cells are electrically transmitted to a control unit (not shown) which includes a computer. Control units for combinational weighing systems have been disclosed, for example, in U.S. Pat. Nos. 4,396,078, 4,399,880 and 4,491,189. Computer algorithms for selecting a combination have also been disclosed in these references and incorporated in products such as Models CCW-201RLC, CCW-211RLC and CCW-212-3F/2F produced and sold by the assignee corporation. The aforementioned patents and products are herein incorporated by reference, and a control unit suitable for the system 10 can be constructed and a computer program for its operation embodying the present invention can be written easily by a person skilled in the art by making reference thereto.

The lower part of the system 10 is comprised of a chute assembly of the type disclosed in Japanese Patent Application Tokugan No. 59-170330, including a funnel-shaped outer chute 20 coaxially surrounding a funnel-shaped inner chute 21 in such a way that they form two separate discharge routes. At the bottom end, the outer chute 20 is divided into two separate passages where it is connected to left-hand and right-hand timing hoppers (referred to together as the first timing hopper) 24 which is, in turn, connected to a first lower chute 25 so that the articles discharged into the outer chute 20 join together at the first lower chute 25. At the bottom of the inner chute 21 is provided a second timing hopper 27 which is connected to a second lower chute 28.

FIG. 2 is a view of the bottom part of the system 10 seen along the line 2—2 of FIG. 1. As shown in FIG. 1, each weigh hopper 18 is provided with two gates which, when closed, join each other directly above the top edge of the inner chute 21. The weigh hopper 18 can be discharged by selectably opening one of these gates. In other words, the article batch in any of the weigh hoppers 18 can be selectably discharged through either of the two discharge routes defined by the inner and outer chutes 21 and 20.

FIG. 3 is a plan view of the system 10 seen along the line 3—3 of FIG. 1 for the purpose of showing the circularly arranged article batch handling units (represented by weigh hoppers) with respect to the top edges of the outer chute 20 and the inner chute 21.

A method of operating the system 10 of FIGS. 1, 2 and 3 according to one embodiment of the present invention is explained below by way of a timing chart of FIG. 4 and an action flow chart of FIG. 5. In FIGS. 4 and 5, "combinational computation" is abbreviated into "Comb. Comp.", "timing hoppers" into "TH", and "weigh hoppers" into "WH". In FIG. 4, the arrows indicate the flows of the weighed article batches.

A high-speed dual packaging unit (not shown) of the type described above is connected to the lower chutes 25 and 28. Output timing signals $T_A$ and $T_B$ alternate at even intervals as shown in FIG. 4. The system's control unit sets a flag to 1 or 0, depending n whether timing signal $T_A$ or $T_B$ is received and causes the first or second timing hopper to be opened respectively, as shown in FIG. 4.

When a timing signal $T_A$ or $T_B$ is detected, nine of the 18 weigh hoppers of the system are selected and the measured weight values therefrom are read and inputted to the control unit. A combinational computation is performed on the basis of these nine measured weight values and a combination of four of these weight values is selected according to a predetermined criterion such as the combination giving a total weight value within a predetermined interval or closest to a given target value. Let us assume that a combination satisfying the predetermined criterion has been found and identified and that the flag value has been 0. Then, the second timing hopper 27 and the inside gates of the weigh hoppers 18 corresponding to the selected combination of weight values are opened so that the article batches in these weigh hoppers in the selected combination are discharged through the inner chute 21 and the second lower chute 28 to the dual packaging unit. Similarly, if a combination has been selected and the flag value has been 1, the first timing hopper 24 and the outside gates of the selected weigh hoppers are opened so that the article batches in these weigh hoppers are discharged through the outer chute 20 and the first lower chute 25 to the dual packaging unit.

If no combination satisfying the predetermined criterion is found (when "Combination selected?" in FIG. 5 is answered with "No"), combinational computation must be repeated and this is carried out by opening and closing a pool hopper or pool hoppers corresponding to those weigh hoppers with a measured weight value less than a predetermined value and having the article feeding unit (dispersion table 12 and feed troughs 13) deliver fresh articles to these pool hoppers.

After a combination satisfying the predetermined criterion has been found and the article batches from the corresponding weigh hoppers have been discharged to the packaging unit as explained above, these weigh hoppers which have just discharged their article batches are identified as shown in FIG. 5.

While the aforementioned four selected weigh hoppers are discharging their article batches, nine weigh hoppers are selected out of the remaining fourteen weigh hoppers, weight values are read therefrom and a combinational computation is carried out on the basis of these inputted weight values to similarly select a combination of four weigh hoppers according to the same predetermined criterion. This time, the outer gates of these four selected weigh hoppers are opened together with the first timing hopper 24 so that the discharged article batches travel to the packaging unit through the outer chute 20 and then the first lower chute 25. These four weigh hoppers are also identified.

Before the discharging process described above is completed, nine weigh hoppers are selected from the remaining ten weigh hoppers (the total of 18 weigh hoppers minus the eight identified weigh hoppers), their weight values are inputted, a combinational computation is performed on the basis of these inputted weight values to select a combination of four values. This time, the article batches from the selected weigh hoppers are discharged into the inner chute 21.

At this point, there are six weigh hoppers left which have not been selected as a result of combinational computation. To these six weigh hoppers are added the four weigh hoppers which were selected after the first combinational computation and have since been refilled. The next round of combinational computation is performed by selecting nine out of these ten weigh hoppers and inputting their weight values. The article batches from the similarly selected four weigh hoppers are then discharged into the outer chute 20.

This process is thereafter repeated so that a combination of article batches is discharged at the rate of three times per measurement cycle through alternate discharge routes. In short, the method described above according to this embodiment of the present invention is characterized in that the action cycles of three groups of weight values undergoing combinational computations are overlapped by two-thirds so that discharging is effected alternately through two routes three times per measurement cycle.

It should be mentioned at this point that the presence of timing hoppers 24 and 27 as shown in FIGS. 1 and 2 is not essential. These timing hoppers 24 and 27, however, serve to make certain that the groups of article batches sequentially discharged through the same chute are separated, thus contributing to improve the system reliability.

According to a second embodiment of the present invention which is described in what follows, the action cycles of the aforementioned three groups are completely overlapped so that the series of processes including supplying articles, weighing article batches, performing combinational computations and discharging article batches are carried out simultaneously but the discharge timing is differentiated among the groups so that the selected article batches are alternately discharged through two discharge routes. A system for using this method is schematically illustrated in FIGS. 6, 7 and 8 to show the difference in the structure of the chute assembly as compared to that shown in FIG. 1. The top part, the number of article batch handling units and the plan view of this system are the same as shown in FIGS. 1 and 3. FIG. 6 is a front view and FIG. 7 is a side view. FIG. 8 is a view seen along the line 8—8 in FIG. 6. Corresponding parts are indicated by the same numerals in these figures.

The chute assembly at the lower part of this system is characterized in that it comprises a funnel-shaped inner chute 31 and two completely separated outer chutes which, for convenience, will be referred to as outer left-hand chute 32 and outer right-hand chute 33, and they are so structured that article batches discharged into the outer left-hand chute 32 are collected temporarily inside a first intermediate hopper 41, those discharged into the inner chute 31 are collected similarly inside a second intermediate hopper 42 and those discharged into the outer right-hand chute 33 are collected inside a third intermediate hopper 43. As seen in FIGS. 7 and 8, the three intermediate hoppers 41, 42 and 43 are disposed in a side-by-side relationship with respect to one another and each of them is provided with two gates adapted to open selectably in forward and backward directions. Below the three intermediate hoppers 41, 42 and 43, there are two rows (front row 46 and back row 47) of three timing hoppers each such that the contents of the intermediate hoppers 41, 42 and 43 drop into the three timing hoppers of the front row 46 respectively if the front gates of the intermediate hoppers 41, 42 ad 43 are opened and into those of the back row 47 respectively if the back gates of the intermediate hoppers 41, 42 and 43 are opened. Below the timing hoppers of the front row 46 and the back row 47 are respectively a front lower chute 51 and a back lower chute 52 for discharging the contents of the timing hoppers of the front row 46 and back row 47, respectively, to a dual packaging unit (not shown) of the type considered above. The article feeding unit (not shown) is again assumed to be so adjusted that article batches are supplied to the individual article batch handling units so that four weight values will be selected by each cycle of combinational computation. The system is also so adjusted that articles to be weighed are immediately supplied to the article batch handling units which have just discharged article batches.

A method of operating the system depicted in FIGS. 6, 7 and 8 according to the present invention is explained below by way of a timing chart of FIG. 9 and an action flow chart of FIG. 10. As in the embodiment explained above, time signals $T_A$ and $T_B$ are alternately outputted at even intervals from a dual packaging unit (not shown) serving to receive combined article batches discharged through the lower chutes 51 and 52 and flag is set to 1 or 0, depending on whether timing signal $T_A$ or $T_B$ is detected. For the convenience of operation control, these timing signals are also sequentially numbered from one to three as shown in FIG. 9. When a timing signal numbered 3 ($i=3$), be it $T_A$ or $T_B$, the weight values from all eighteen weigh hoppers are inputted to the control unit together for combinational computations as follows. Firstly, the weight values from the weigh hoppers belonging to the nine article batch handling units on the right-hand side (referred to as the first group, or WH1) are made the basis of a combinational computation of the type considered above and four of them are selected according to a predetermined criterion. Secondly, weight values from the weigh hoppers belonging to the nine article batch handling units on the left-hand side (referred to as the second group, or WH2) are similarly made the basis of another combinational computation and four of them are selected. Thirdly, nine out of the remaining ten ($=18-4-4$) weigh hoppers (referred to as the third group, or WH3) are considered and four of them are similarly selected by a third round of combinational computations. If any of the groups fails to produce a combination according to the aforementioned predetermined criterion, one or more of the pool hoppers are operated as explained in connection with the previous embodiment. Article batches from the weigh hoppers of the first group are discharged into the outer right-hand chute 33 and reach the third intermediate hopper 43, those of the second group are discharged into the outer left-hand chute 32 and reach the second intermediate hopper 42, and those of the third group are discharged into the inner chute 31 and reach the first intermediate hopper 41. Although FIG. 9 shows a timing program according to which the aforementioned three groups of weigh hoppers are emptied simultaneously, they may be emptied sequentially in the order of completion of the combinational computation for the individual groups. In FIGS. 9 and 10, the first, second and third intermediate hoppers are respectively referred to as IH1, IH2 and IH3.

Next, the articles temporarily pooled inside the intermediate hoppers 41, 42 and 43 are discharged according to the timing schedules shown in FIG. 9 alternately into one or the other of the two rows 46 and 47 of timing hoppers below. Thus, three groups of articles collected in the intermediate hoppers 41, 42 and 43 are transferred per measurement cycle (for example, from the output of one timing signal with $i=3$ to the next signal with $i=3$) alternately through timing hoppers of different rows. The timing hoppers of each row serve to discharge their contents into the lower chute 51 or 52 below and to the dual packaging unit until the next supplies of articles arrive. In FIG. 9, the three timing hoppers of the front row 46 below the three intermediate hoppers 41, 42 and 43 are denoted as TH(F1), TH(F2) and TH(F3), respectively, and those of the back row 47 as TH(B1), TH(B2) and TH(B3), respectively. Thus, there is a phase difference of 60° between each of the timing hoppers on the front row 46 and its neighboring timing hopper on the back row 47 (such as between TH(F1) and TH(B1)) when they discharge. Between two neighboring timing hoppers of the same row (such as between TH(B2) and TH(B3)), there is a phase difference of 120°. In summary, three groups of combined article batches are discharged simultaneously from the weigh hoppers but they are discharged at the end to the packaging unit at even intervals alternately through the two lower chutes 51 and 52. In other words, three groups of combined article batches are simultaneously collected through three routes (inner and outer chutes 31, 32 and 33 leading to three intermediate hoppers 41, 42 and 43) which, however, are switched in the lower part into two discharge routes (front and back lower chutes 51 and 52). Thus, collection can be effected relatively leisurely in the upper part where collection usually takes a longer time but the collected batches can be discharged at a faster rate at the lower part without any difficulty in separating batches being discharged in successive cycles.

It is to be understood that all hoppers include means for automatically closing a preselected amount of time after they are opened. The durations of time during which hoppers of different types remain open need not be identical. Furthermore, the opening and closing of the pool hoppers should be activated after the selected weigh hoppers are opened but the pool hoppers must be so programmed that new articles are not fed into the weigh hoppers until the weigh hoppers are closed.

Figure 12:
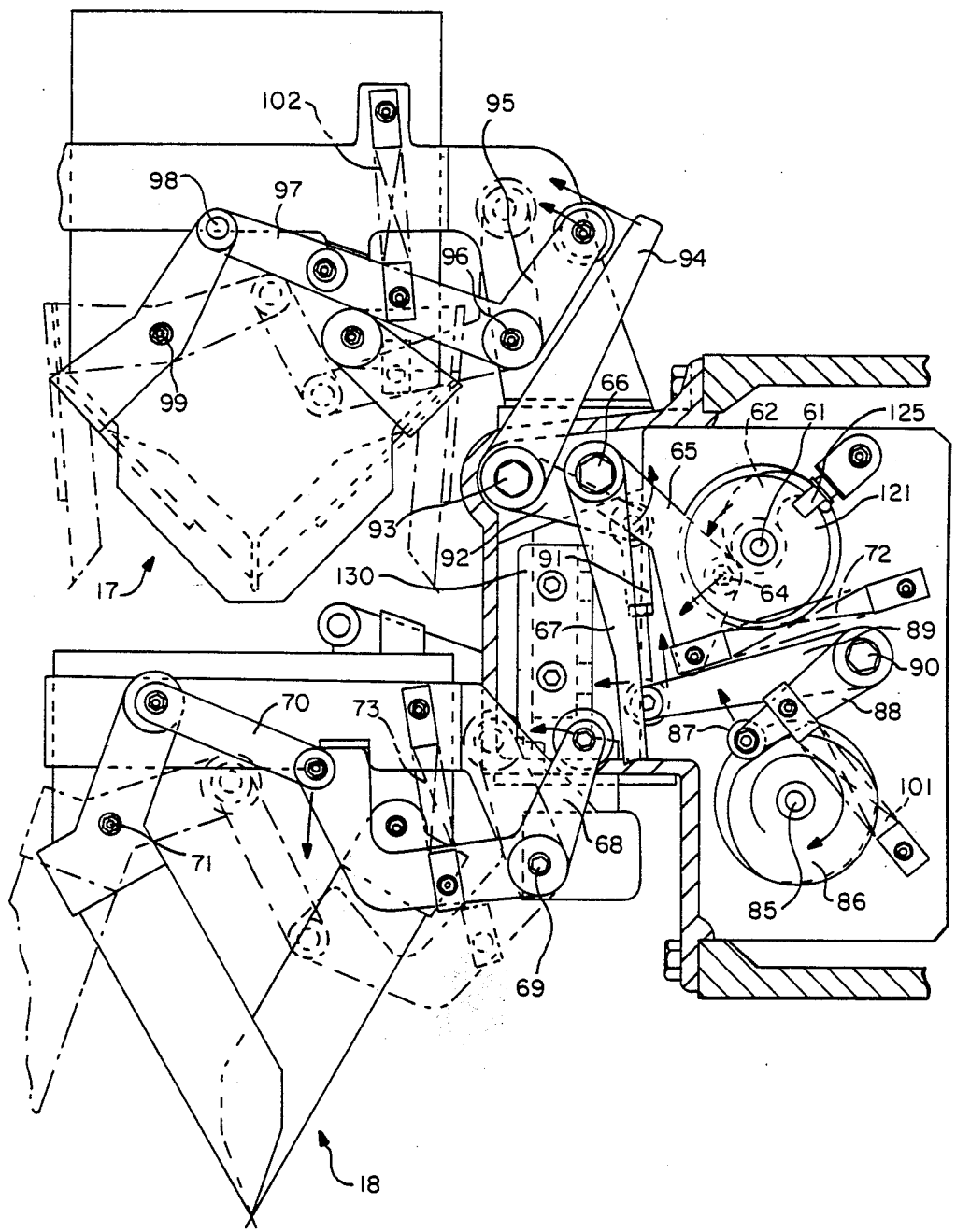
FIG. 12 is a side elevational view taken along the line 12—12 of FIG. 11.

FIGS. 11, 12 and 13 are partially sectional views of a hopper-operating mechanism for each article batch handling unit according to one embodiment of the present invention. FIG. 11 is its plan view. FIGS. 12 and 13 are respectively its right- and left-hand side view (as one faces the center of the system).

Identical components are designated by the same numerals in these figures. U.S. patent application Ser. No. 762,722 filed on Aug. 5, 1985 and assigned to the present assignee (as well as Model CCW-S manufactured and sold by the assignee corporation) discloses a hopper-operating mechanism for a combinational weighing system comprising a central motor rotating at a constant speed and hopper-driving means for the individual article batch handling units. Each hopper-driving means includes cams, clutches and brakes to open and close the gates of the pool and weigh hoppers belonging to the article batch handling units. By contrast, the hopper-operating mechanism according to the preferred embodiment shown in FIGS. 11, 12 and 13 is characterized in that use is made of stepping motors of which the rate and direction of rotation can be freely varied so that the clutches and brakes in prior art hopper-driving means are dispensed with and hence the space occupied by the hopper-driving means can be reduced. Additional advantages of using stepping motors for the hopper-driving mechanisms of a combinational weighing system include: (1) since the hopper gates can be controlled in accordance with the characteristics of the articles to be weighed, damage to the articles to be weighed and noise can be reduced; (2) the two gates belonging to each hopper can be individually controlled by varying the direction of rotation of the associated stepping motor so that the size of the hopper-driving mechanism as well as the number of components thereof can be reduced and hence that the inspection becomes easier; and (3) the speed and direction of rotation can be varied simply by a digital control and design changes can be effected easily by an open-loop control.

Reference being now made to FIGS. 11, 12 and 13, each hopper-operating mechanism for an individual article batch handling unit includes two stepping motors. Numeral 61 indicates the shaft of a stepping motor for independently operating the inner and outer gates of the associated weigh hopper 18 and numberal 75 indicates the shaft of the other stepping motor for operating the gates of the associated pool hopper 17.

At one end of the shaft 61, there is secured thereonto a cam 62 for operating the outer gate of the weigh hopper 18 as shown in FIG. 12. Similarly, another cam 63 is secured at the other end of the shaft 61 for operating the inner gate of the weigh hopper 18 as shown in FIG. 13. If the shaft 61 is rotated in a counterclockwise direction with respect to FIG. 12 by 180°, the cam 62 presses a cam follower 64 and this causes lever members 65 and 67 of a single lever to rotate around an axis 66 in a clockwise direction. This in turn causes the lever member 67 to push a U-shaped lever 68 to rotate as shown by dotted lines around an axis 69. This motion is transmitted to the outer gate of the weigh hopper 18 through a linking member 70, causing it to rotate around its axis of rotation 71. When the outer gate of the weigh hopper 18 is closed, the associated stepping motor is rotated in the reverse direction around its shaft 61 to bring the cam 62 back to its original position. As the cam 62 is caused to rotate, the lever members 65 and 67 are rotated to the left by the force of a spring 72 and the U-shaped lever 68 is rotated to the right by a spring 73.

The inner gate of the weigh hopper 18 is similarly opened and closed. When the shaft 61 is rotated in a counterclockwise direction with respect to FIG. 13 (which is a clockwise direction with respect to FIG. 12) by 180° from the position where both inner and outer gates are closed, the cam 63 on the other end of the shaft 61 pushes a cam follower 64 to cause lever members 75 and 76 to rotate around their axis of rotation 77. This causes a roller 78 on an L-shaped lever to rotate to the right around its axis of rotation 79, a link 80 to rotate likewise around a pin 81, and the pin 81 around an axis of rotation 82, as shown by dotted lines. It is to be noted in FIGS. 12 and 13 that the cams 62 and 63 are so shaped that the cam follower 64 will not be pushed by the cam 62 if the shaft 61 turns in a clockwise direction with respect to FIG. 12 and that the cam follower 74 likewise will not be pushed by the cam 63 if the shaft 61 turns in a clockwise direction with respect to FIG. 13. When the inner gate of the weigh hopper 18 is closed, the stepping motor therefor is rotated backwards and the restoring forces in springs 83 and 84 pull the lever members 75 and 76, the roller 78 and the link 80.

The other stepping motor for operating the gates of the associated pool hopper 17 is provided at one end of its shaft 85 with a cam 86 as shown in FIG. 12. When the shaft 85 is rotated by 360°, the cam 86 pushes a cam follower 87 upwards during the first 180°-rotation, causing level members 88 and 89 to rotate in a clockwise direction around its axis of rotation 90. Lever members 92 and 94 rotatably connected thereto through a link 91 is thereby caused to rotate around an axis 93 in a counterclockwise direction to push an L-shaped lever 95. When the lever 95 is rotated around an axis 96 in this way, a link 97 is rotated around a pin 98 and the pin 98 around an axis 99 as shown by dotted lines to open the outer gate. If the outer gate is opened, this motion is transmitted through a link 100 to simultaneously open the outer gate.

As the cam 88 is rotated further by 180°, springs 101 and 102 pull the cam follower 87 downwards, causing the levers 88, 89, 92 and 94 and the links 91, 97 and 100 to rotate in reverse directions to close the gates.

Numerals 121 and 122 indicate disks provided with a slit attached respectively to the shafts 61 and 85 of the stepping motors so that these slits can be detected by photosensors 125 and 126. They are for the purpose of detecting the initial positions of the shaft 61 and 85. Their positioning is usually not required except, for example, after a runaway situation. Numeral 130 indicates a load cell.

The foregoing description of preferred embodiments of the invention has been presented for purposes of illustration and description. It is not intended to be exhaustive or to limit the invention to the precise form disclosed, and obviously many modifications and variations are possible in light of the above teachings. Firstly, for example, the presence of six timing hoppers as illustrated in FIGS. 6, 7 and 8 is not essential although they serve to allow the gates of the intermediate hoppers 41, 42 and 43 to operate leisurely. If the timing hoppers of FIGS. 6, 7 and 8 are dispensed with, the control of the system must be so modified as to have the contents of the intermediate hoppers 41, 42 and 43 discharged alternately and directly into the two lower chutes 51 and 52.

Secondly, although the method of control according to the present invention was described above by way of two embodiments both of which involved obtaining three selected combinations per measurement cycle and discharging them through two discharge routes, the purpose of the present invention to improve the processing efficiency of combinational weighing can be achieved, for example, by obtaining four selected combinations by combinational computation per measurement cycle and discharging them through a smaller number of discharge routes such as two or three so that the discharge rate per packaging machine can be increased when a dual- or multiple-type packaging unit is used in connection with the combinational weighing system. In general, the aforementioned object of the present invention is achieved if a first number (equal to or greater than three) of computed combinations are selected per cycle and are discharged into a second number (equal to or greater than two but smaller than the first number) of discharge routes. If three or more discharge routes are provided, discharge therethrough must be effected cyclically in a predetermined sequence.

Thirdly, the control unit (not shown in FIG. 1) need not be of any particular structure. FIG. 14 is a block diagram which schematically shows one preferred embodiment of the control unit 150 including a computation and control unit ("Computer") 152 which comprises a preprogrammed microprocessor and an adder controlled by the microprocessor for calculating the total weight of article batches in specified weigh hoppers. The weight signals indicative of the weights of article batches measured by the individual weighing devices such as load cells 130 are inputted to the computation and control unit 150 through an analog-to-digital converter 154. The control signals for operating the various hoppers (pool hoppers (PH) 17, weigh hoppers 18, intermediate hoppers 41-43 and timing hoppers 46, 47), or the drivers for driving these hoppers as well as the article feeding unit are buffered by interface means 158 which include latches for holding the state of each device and timing means for automatically closing each hopper a predetermined amount of time after it is opened. Alternatively, the control unit for the present invention may include a plurality of independent, cooperating computers as disclosed in U.S. patent application Ser. No. 772,244 filed Sept. 3, 1985 and assigned to the present assignee, one of the computers serving, for example, to receive weight signals, another to carry out combinational calculations and a third to drive the hoppers according to inputted signals.

Fourthly, the eighteen article batch handling units of the system depicted in FIG. 6 need not be circularly arranged as shown in FIG. 3. Instead, they may be arranged in an elongated circular formation with two semi-circular sections including seven article batch handling units each and a center section including four article batch handling units. This arrangement is advantageous in that the four article batch handling units of the center section can be made removable so that a conventional type with a circular arrangement of fourteen article batch handling units can be realized, depending on the conditions of the situation. Moreover, the chute assembly depicted in FIG. 6 with two outer chutes and one inner chute leading down to three linear arranged intermediate hoppers can be designed more easily, approximately equating among the aforementioned three groups the distances between the weigh hoppers and the intermediate hoppers, and thus reducing the fluctuations in the time of travel of the article batches being discharged. It further goes without saying that the number of article batch handling units included in the system may be different from eighteen and that the individual components of the article batch handling units may have sizes and structures different from those illustrated in the figures.

It is intended that such changes and modifications which may be apparent to a person skilled in the art are included within the scope of the present invention.

What is claimed is:

1. A method of operating a combinational weighing system which comprises
   a plurality (N-number) of article batch handling units each serving to receive an article batch, to output a weight value indicative of the weight of said article batch, and to discharge said article batch, and
   a control means serving to periodically carry out combinational computation and to select a combination of said article batch handling units,
   said method comprising the steps of
   determining a first number of selected combinations of article batch handling units per cycle of said control means, and
   discharing said first number of groups of article batches from said selected combinations of article batch handling units through a second number of discharge routes per cycle of said control means in a predetermined cyclic sequence, said second number being smaller than said first number.

2. The method of claim 1 wherein said N-number is 18, said first number is 3 and said second number is 2.

3. The method of claim 1 wherein said determining step comprises obtaining said first number of selected combinations of article batch handling units sequentially.

4. The method of claim 1 wherein said determining step comprises obtaining said first number of selected combinations of article batch handling units simultaneously.

5. The method of claim 1 wherein said discharging step comprises simultaneously discharging said first number of groups of article batches into as many upper discharge routes.

6. The method of claim 5 wherein said upper discharge routes include intermediate hoppers.

7. The method of claim 1 wherein said discharging step comprises sequentially discharging said first number of groups of article batches.

8. A combinational weighing system comprising
   a plurality (N-number) of article batch handling units each serving to receive an article batch, to output a weight value signal indicative of the weight of said article batch, and to discharge said article batch in response to a discharge signal,
   a control means serving to periodically carry out combinational computation on the basis of inputted weight values, to thereby select a first number of combinations of article batch handling units during each period and to output discharge signals to said selected combinations of article batch handling units, and
   a chute assembly serving to collect article batches discharged from said article batch handling units and to discharge said collected article batches sequentially through a second number of separate discharge routes, said second number being smaller than said first number, said control means further serving to output route-selecting signals to thereby cause article batches to be discharged from said chute assembly through said second number of separate discharge routes in a predetermined sequence.

9. The system of claim 8 wherein said second number is 2 and said control means serves to cause articles discharged from said selected article batch handling units to be discharged alternately through said two separate discharge routes.

10. The system of claim 9 wherein said first number is 3.

11. The system of claim 8 wherein said N-number is 18.

12. The system of claim 8 wherein said plurality of article batch handling units are arranged in an elongated circular formation with two semi-circular sections and a central section.

13. The system of claim 8 wherein said chute assembly includes a funnel-shaped inner chute, a funnel-shaped outer chute external to said inner chute, a first lower chute and a second lower chute, said inner chute and said first lower chute defining a first discharge route, and said outer chute and said second lower chute defining a second discharge route.

14. The system of claim 13 wherein each of said article batch handling units is so disposed and structured that articles therein can be selectably discharged through either said first discharge route or said second discharge route.

15. The system of claim 14 wherein each of said article batch handling units includes a weigh hopper having two gates serving to open in opposite directions.

16. The system of claim 15 wherein said two gates are operated by a stepping motor.

17. The system of claim 8 wherein said chute assembly includes a funnel-shaped inner chute, a first outer chute and a second outer chute, each of said outer chutes being disposed to partially surround said inner chute.

18. The system of claim 17 wherein said article batch handling units are so disposed and structured that articles contained in a first group of said article batch handling units can be selectably discharged either into said inner chute or into said first outer chute and that articles contained in a second group of said article batch handling units can be selectably discharged either into said inner chute or into said second outer chute.

19. The system of claim 17 wherein said chute assembly further includes a first lower chute and a second lower chute, said lower chutes being connected to said inner, first outer and second outer chutes such that articles in said inner, first outer or second outer chute can be selectably discharged either into said first lower chute or into said second lower chute.

20. The system of claim 19 wherein said control means further serves to cause articles discharged from said selected article batch handling units to be discharged alternately into said first lower chute and said second lower chute.

* * * * *